(12) United States Patent
Yang

(10) Patent No.: US 11,340,507 B2
(45) Date of Patent: May 24, 2022

(54) DISPLAY PANEL AND ARRAY SUBSTRATE THEREOF

(71) Applicant: TCL China Star Optoelectronics Technology Co., Ltd., Shenzhen (CN)

(72) Inventor: Hui Yang, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/617,191

(22) PCT Filed: Aug. 5, 2019

(86) PCT No.: PCT/CN2019/099188
§ 371 (c)(1),
(2) Date: Nov. 26, 2019

(87) PCT Pub. No.: WO2020/224069
PCT Pub. Date: Nov. 12, 2020

(65) Prior Publication Data
US 2022/0050346 A1    Feb. 17, 2022

(30) Foreign Application Priority Data

May 6, 2019  (CN) .......................... 201910370898.4

(51) Int. Cl.
*G02F 1/136*  (2006.01)
*G02F 1/1362*  (2006.01)
*G09G 3/36*  (2006.01)

(52) U.S. Cl.
CPC ..... *G02F 1/136286* (2013.01); *G09G 3/3614* (2013.01)

(58) Field of Classification Search
CPC .................. G02F 1/136286; G09G 3/3614
USPC ........................................... 349/33
See application file for complete search history.

(56) References Cited

U.S. PATENT DOCUMENTS

| | | | |
|---|---|---|---|
| 2007/0046610 A1 | 3/2007 | Okuzono | |
| 2016/0247822 A1* | 8/2016 | Chen .................... | G09G 3/3614 |
| 2016/0351136 A1 | 12/2016 | He et al. | |
| 2017/0064221 A1* | 3/2017 | Taylor ................... | H04N 5/235 |
| 2018/0053461 A1 | 2/2018 | Tien et al. | |

(Continued)

FOREIGN PATENT DOCUMENTS

| | | |
|---|---|---|
| CN | 101216649 A | 7/2008 |
| CN | 104880874 A | 9/2015 |
| CN | 105954951 A | 9/2016 |

(Continued)

*Primary Examiner* — Nathanael R Briggs
*Assistant Examiner* — William D Peterson
(74) *Attorney, Agent, or Firm* — Nathan & Associates; Menachem Nathan

(57) ABSTRACT

An array substrate and a display panel are provided, including a plurality of pixel grouping units, a plurality of data lines and a plurality of dual scan lines. Each of the pixel grouping units includes at least two subpixels. The plurality of pixel grouping units are arranged in rows and columns Adjacent pixel grouping units arranged in a row direction have opposite polarities and adjacent pixel grouping units arranged in a column direction have opposite polarities. Each of the data lines is located between any two adjacent columns of the pixel grouping units. Each of the plurality of dual scan lines is located between any two adjacent rows of the subpixels.

8 Claims, 3 Drawing Sheets

(56) References Cited

U.S. PATENT DOCUMENTS

| | | | |
|---|---|---|---|
| 2018/0211617 A1 | 7/2018 | Li et al. | |
| 2020/0241707 A1* | 7/2020 | Lee | ........................ G06F 1/1626 |

FOREIGN PATENT DOCUMENTS

| | | |
|---|---|---|
| CN | 106328039 A | 1/2017 |
| CN | 106710555 A | 5/2017 |
| CN | 107871485 A | 4/2018 |
| CN | 108847194 A | 11/2018 |
| CN | 208156380 U | 11/2018 |
| CN | 109272951 A | 1/2019 |
| JP | 2007065454 A | 3/2007 |

* cited by examiner

DISPLAY PANEL AND ARRAY SUBSTRATE THEREOF

FIELD OF THE DISCLOSURE

The present application relates to liquid crystal panel industries, and more particularly to a display panel and an array substrate thereof.

DESCRIPTION OF RELATED ARTS

For liquid crystal display panels, liquid crystal molecules will be polarized after DC voltages are applied to the liquid crystal for a long time. To avoid the liquid crystal molecules being polarized, it needs to change the polarities of pixel electrode voltages periodically.

Since column inversion is directed to the smallest source driving power, it is used to change the polarities of pixel electrode voltages for separated column such that same polarity is provided for a same column and different polarities are provided for adjacent columns When the liquid crystal panels are driven using the column inversion, voltages of adjacent data lines have opposite polarities. After brightness deviation is averaged spatially, a "flicker" phenomenon is diminished as compared to frame inversion. Also, horizontal crosstalk is low as compared to the frame inversion. However, voltages of adjacent pixels along a vertical direction have same polarity and thus crosstalk is easy to be caused in the vertical direction. When human eyes view a screen image on a display screen, stripes will be appeared in the displayed screen image and it presents an obvious phenomenon of "head shaking stripes" as human eyes move.

Above all, when the column inversion is used for the liquid crystal display panels to change the polarities of pixel electrode voltages, crosstalk will be caused by voltages between adjacent pixels. When human eyes view a screen image on a display screen, an obvious phenomenon of "head shaking stripes" is presented.

TECHNICAL PROBLEMS

The objective of the present application is to provide a display panel and an array substrate thereof, capable of preventing a phenomenon of "head shaking stripes" from appearing on a screen as human eyes move in viewing a screen image on a display screen.

TECHNICAL SOLUTIONS

To solve above problems, embodiments of the present application provides an array substrate, including:
  a plurality of pixel grouping units, each of which includes at least two subpixels, the plurality of pixel grouping units arranged in rows and columns, adjacent pixel grouping units arranged in a row direction having opposite polarities and adjacent pixel grouping units arranged in a column direction having opposite polarities;
  a plurality of data lines, each of which is located between any two adjacent columns of the pixel grouping units; and
  a plurality of dual scan lines, each of the plurality of dual scan lines located between any two adjacent rows of the subpixels.
  Further, each of the plurality of pixel grouping units includes two subpixels that are arranged in the row direction and have opposite polarities.
  Further, each of the plurality of pixel grouping units includes four subpixels that are arranged in two rows and two columns.
  Further, two of the four subpixels arranged in the row direction have opposite polarities and two of the four subpixels arranged in the column direction have same polarity.
  Further, the pixel grouping unit includes six subpixels that are arranged in three rows and two columns and two adjacent subpixels of the six subpixels arranged in a same row direction have opposite polarities.
  Further, two adjacent subpixels of the six subpixels arranged in a same column direction have opposite polarities.
  Further, all of the six subpixels arranged in a same column direction have same polarity.
  Further, the pixel grouping unit includes eight subpixels that are arranged in four rows and two columns and two adjacent subpixels of the eight subpixels arranged in a same row direction have opposite polarities.
  Further, the array substrate further includes a plurality of virtual pixels arranged in a peripheral area of the plurality of the pixel grouping units.
  The present application further provides an array substrate, including:
  a plurality of pixel grouping units, each of which includes at least two subpixels, the plurality of pixel grouping units arranged in rows and columns, adjacent pixel grouping units arranged in a row direction having opposite polarities and adjacent pixel grouping units arranged in a column direction having opposite polarities;
  a plurality of data lines, each of which is located between any two adjacent columns of the pixel grouping units; and
  a plurality of dual scan lines, each of the plurality of dual scan lines located between any two adjacent rows of the subpixels,
  wherein each of the plurality of pixel grouping units includes two subpixels that are arranged in the row direction and have opposite polarities; and
  wherein each of the plurality of pixel grouping units includes four subpixels that are arranged in two rows and two columns.
  Further, two of the four subpixels arranged in the row direction have opposite polarities and two of the four subpixels arranged in the column direction have same polarity.
  Further, the pixel grouping unit includes six subpixels that are arranged in three rows and two columns and two adjacent subpixels of the six subpixels arranged in a same row direction have opposite polarities.
  Further, two adjacent subpixels of the six subpixels arranged in a same column direction have opposite polarities.
  Further, all of the six subpixels arranged in a same column direction have same polarity.
  Further, the pixel grouping unit includes eight subpixels that are arranged in four rows and two columns and two adjacent subpixels of the eight subpixels arranged in a same row direction have opposite polarities.
  Further, the array substrate further includes a plurality of virtual pixels arranged in a peripheral area of the plurality of the pixel grouping units.
  Embodiments of the present application further provides a display panel, including an array substrate which includes:

a plurality of pixel grouping units, each of which includes at least two subpixels, the plurality of pixel grouping units arranged in rows and columns, adjacent pixel grouping units arranged in a row direction having opposite polarities and adjacent pixel grouping units arranged in a column direction having opposite polarities;

a plurality of data lines, each of which is located between any two adjacent columns of the pixel grouping units; and a plurality of dual scan lines, each of the plurality of dual scan lines located between any two adjacent rows of the subpixels.

BENEFICIAL EFFECTS

Above all, the array substrate provided in the present application includes a plurality of pixel grouping units. Each of the pixel grouping units includes at least two subpixels. The plurality of pixel grouping units are arranged in rows and columns Adjacent pixel grouping units arranged in a row direction have opposite polarities and adjacent pixel grouping units arranged in a column direction have opposite polarities. The array substrate further includes a plurality of data lines, each of which is located between any two adjacent columns of the pixel grouping units. The array substrate further includes a plurality of dual scan lines. Each of the plurality of dual scan lines is located between any two adjacent rows of the subpixels. In such a way, for the pixel grouping units arranged in rows and columns, two adjacent columns of pixel grouping units arranged along the column direction have different polarities and two adjacent rows of pixel grouping units arranged along the row direction have different polarities. Accordingly, crosstalk will not be caused by voltages between adjacent pixel grouping units. When human eyes view a screen image on a display screen, a phenomenon of "head shaking stripes" will not be caused as human eyes move. This improves user experiences.

DESCRIPTION OF DRAWINGS

To illustrate the technical solutions in the embodiments of the present invention more clearly, the following briefly introduces the accompanying drawings required for describing the embodiments of the present invention. Apparently, the accompanying drawings in the following description show some embodiments of the present invention, and a person of ordinary skill in the art may still derive other drawings from these accompanying drawings without creative efforts.

DESCRIPTION OF EMBODIMENTS OF THE DISCLOSURE

To make the objectives, technical schemes, and beneficial effects of the present application more clear and specific, the present application is described in further detail below with reference to the embodiments in accompanying with the appending drawings. It should be understood that the specific embodiments described herein are merely for explaining the present invention and the present invention is not limited thereto.

Figure 1:
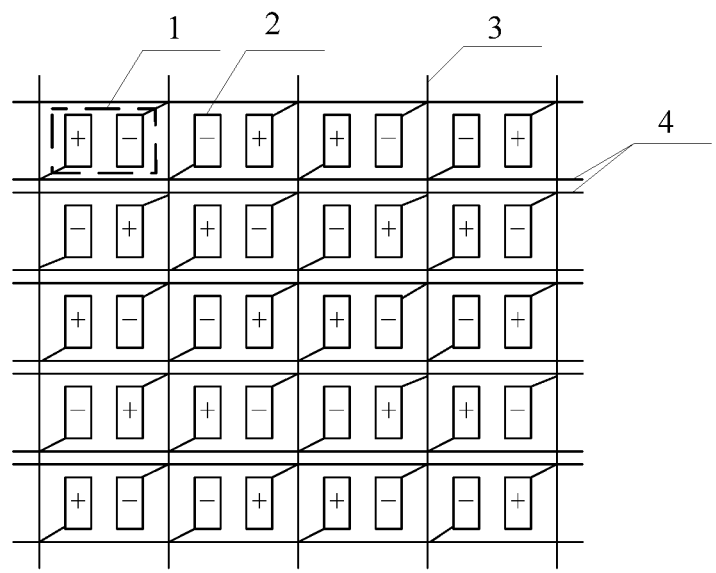
FIG. 1 is a schematic structural diagram illustrating an array substrate provided in accordance with an embodiment of the present application.

FIG. 1 is a schematic structural diagram illustrating an array substrate provided in accordance with an embodiment of the present application. The array substrate includes a plurality of pixel grouping units 1. Each of the pixel grouping units 1 includes at least two subpixels 2. The plurality of pixel grouping units 1 are arranged in rows and columns Adjacent pixel grouping units 1 arranged in a row direction have opposite polarities and adjacent pixel grouping units 1 arranged in a column direction have opposite polarities. The array substrate further includes a plurality of data lines 3, each of which is located between any two adjacent columns of the pixel grouping units 1. The array substrate further includes a plurality of groups of dual scan lines 4. Each group of dual scan lines 4 is located between any two adjacent rows of the subpixels 2.

Specifically, the subpixels 2 include red subpixels 2, blue subpixels 2 and green subpixels 2. The pixel grouping unit 1 consists of any two types of aforesaid subpixels 2. For example, for the pixel grouping units 1 arranged in the row direction, a pixel grouping unit 1 consisting of a blue subpixel 2 and a red subpixel 2, a pixel grouping unit 1 consisting of a green subpixel 2 and a blue subpixel 2 and a pixel grouping unit 1 consisting of a red subpixel 2 and a green subpixel 2 are cyclically arranged in this order. For the pixel grouping units arranged in the column direction, the subpixels 2 of a same column belong to same subpixels 2.

In some embodiments, the subpixels 2 include red subpixels 2, blue subpixels 2, green subpixels 2 and white subpixels 2. The pixel grouping unit 1 consists of any two types of aforesaid subpixels 2. For example, for the pixel grouping units 1 arranged in the row direction, a pixel grouping unit 1 consisting of a white subpixel 2 and a blue subpixel 2 and a pixel grouping unit 1 consisting of a red subpixel 2 and a green subpixel 2 are cyclically arranged in this order. For the pixel grouping units arranged in the column direction, the subpixels 2 of a same column belong to same subpixels 2.

Specifically, the subpixels 2 are connected to the data lines 3 and the scan line 4 groups. Connection between the subpixels 2 and the data lines 3 can be a "Z-type" framework or a "bow-type" framework. Each group of the scan lines 4 involves two scan lines 4 that are connected to the nearest subpixels 2, respectively.

Specifically, for each pair of adjacent pixel grouping units 1 in the row direction, the subpixels 2 having same relative position have opposite polarities. Likewise, for each pair of adjacent pixel grouping units 1 in the column direction, the subpixels 2 having same relative position have different polarities.

Specifically, for each pair of adjacent pixel grouping units 1 in the row direction, the subpixels 2 at mirror positions at two sides of a symmetric axis of adjacent pixel groups may have same polarity, and for each pair of adjacent pixel grouping units 1 in the column direction, the subpixels 2 at mirror positions at two sides of a symmetric axis of adjacent pixel groups may have same polarity.

Specifically, each pixel grouping unit 1 includes two subpixels 2 that are arranged in the row direction and have opposite polarities. The two subpixels 2 of the pixel grouping unit 1 can be consisting of any two types of the red subpixel 2, the blue subpixel 2 and the green subpixel 2, wherein the two types of subpixels 2 are sequentially arranged with positive polarity and negative polarity, or with negative polarity and positive polarity.

Figure 2:
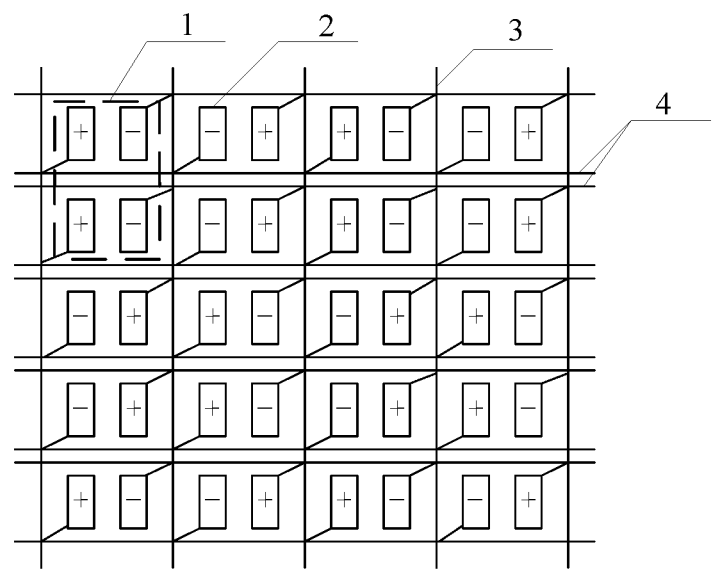
FIG. 2 is another schematic structural diagram illustrating an array substrate provided in accordance with an embodiment of the present application.

FIG. 2 is another schematic structural diagram illustrating an array substrate provided in accordance with an embodiment of the present application. Each pixel grouping unit 1 includes four subpixels 2 that are arranged in two rows and two columns. For the four subpixels 2 of the pixel grouping unit 1, the subpixels 2 arranged along the row direction can be any two types of a red subpixel 2, a blue subpixel 2 and a green subpixel 2, and the subpixels 2 arranged along the column direction are the same.

Specifically, two of the four subpixels arranged in the row direction have opposite polarities and two of the four subpixels arranged in the column direction have same polarity. The subpixels 2 along the row direction can be sequentially arranged with positive polarity and negative polarity, or with negative polarity and positive polarity. The subpixels 2 along the column direction can be sequentially arranged with positive polarity and positive polarity, or with negative polarity and negative polarity.

Figure 3:
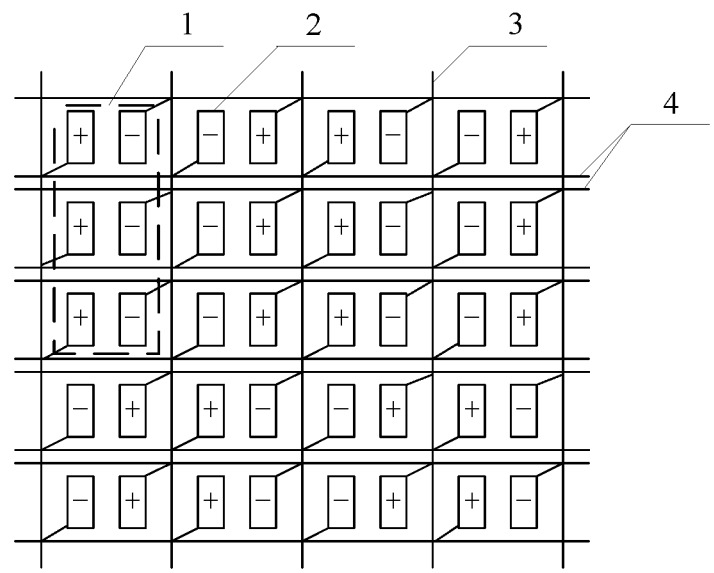
FIG. 3 is another schematic structural diagram illustrating an array substrate provided in accordance with an embodiment of the present application.

FIG. 3 is another schematic structural diagram illustrating an array substrate provided in accordance with an embodiment of the present application. The pixel grouping unit 1 includes six subpixels 2 that are arranged in three rows and two columns and two adjacent subpixels 2 of the six subpixels 2 arranged in a same row direction have opposite polarities. For the six subpixels 2 of the pixel grouping unit 1, the subpixels 2 arranged along the row direction can be any two types of a red subpixel 2, a blue subpixel 2 and a green subpixel 2, and the subpixels 2 arranged along the column direction are the same. The subpixels 2 along the row direction can be sequentially arranged with positive polarity and negative polarity, or with negative polarity and positive polarity. The subpixels 2 along the column direction can be sequentially arranged with positive polarity, positive polarity and positive polarity, or with negative polarity, negative polarity and negative polarity.

Specifically, two adjacent subpixels along a same column direction have opposite polarities. For each pair of adjacent pixel grouping units 1 in the column direction, the subpixels 2 having same relative position have opposite polarities.

Specifically, the subpixels 2 along a same column direction can be sequentially arranged with positive polarity, negative polarity and positive polarity, or with negative polarity, positive polarity and negative polarity.

Specifically, the subpixels 2 along a same column direction can be sequentially arranged with positive polarity, negative polarity and negative polarity, or with negative polarity, negative polarity and positive polarity.

Figure 4:
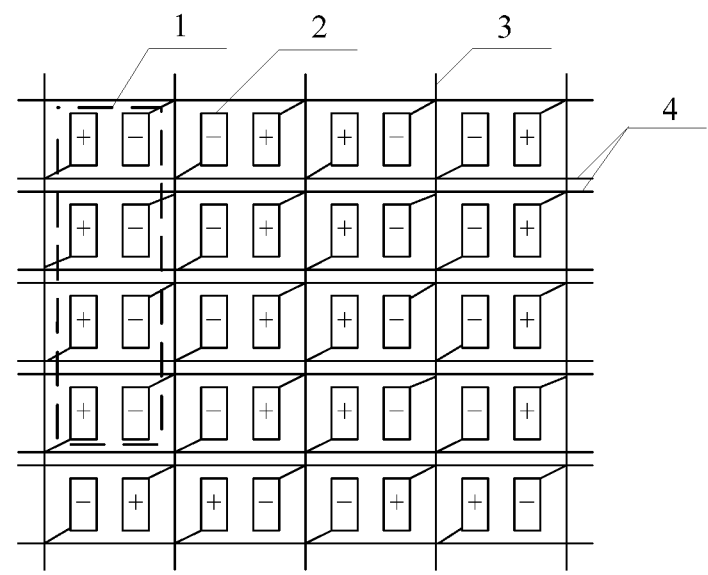
FIG. 4 is another schematic structural diagram illustrating an array substrate provided in accordance with an embodiment of the present application.

In some embodiments, the pixel grouping unit 1 includes eight subpixels 2 that are arranged in three rows and two columns and two adjacent subpixels 2 of the six subpixels 2 arranged in a same row direction have opposite polarities. FIG. 4 is another schematic structural diagram illustrating an array substrate provided in accordance with an embodiment of the present application. For the eight subpixels 2 of the pixel grouping unit 1, the subpixels 2 arranged along the row direction can be any two types of a red subpixel 2, a blue subpixel 2 and a green subpixel 2, and the subpixels 2 arranged along the column direction are the same. The subpixels 2 along the row direction have opposite polarities and can be sequentially arranged with positive polarity and negative polarity, or with negative polarity and positive polarity. The subpixels 2 along the column direction have same polarity and can be sequentially arranged with positive polarity, positive polarity, positive polarity and positive polarity, or with negative polarity, negative polarity, negative polarity and negative polarity.

Specifically, the subpixels 2 along the column direction can also be sequentially arranged with positive polarity, positive polarity, positive polarity and negative polarity, or with negative polarity, negative polarity, negative polarity and positive polarity.

Specifically, the subpixels 2 along the column direction can also be sequentially arranged with positive polarity, positive polarity, negative polarity and positive polarity, or with negative polarity, negative polarity, positive polarity and negative polarity.

Specifically, the subpixels 2 along the column direction can also be sequentially arranged with positive polarity, negative polarity, positive polarity and positive polarity, or with negative polarity, positive polarity, negative polarity and negative polarity.

Specifically, the subpixels 2 along the column direction can also be sequentially arranged with negative polarity, positive polarity, positive polarity and positive polarity, or with positive polarity, negative polarity, negative polarity and negative polarity.

Figure 5:
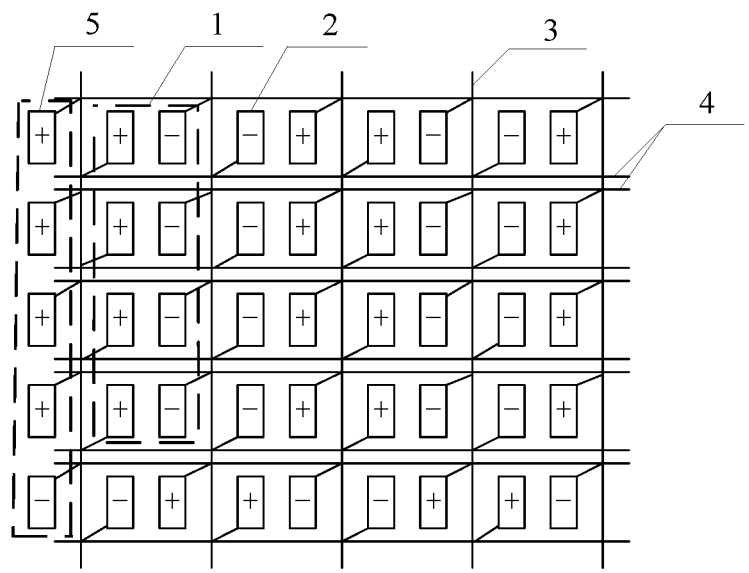
FIG. 5 is another schematic structural diagram illustrating an array substrate provided in accordance with an embodiment of the present application.

In some embodiments, the array substrate further includes a plurality of virtual pixels 5 arranged in a peripheral area of the plurality of the pixel grouping units 1. FIG. 5 is another schematic structural diagram illustrating an array substrate provided in accordance with an embodiment of the present application. The plurality of virtual pixels 5 can be located in the peripheral area at a side or lots of sides of the pixel grouping units 1 or encompass the pixel grouping units 1. The plurality of virtual pixels 5 are ineffective luminous pixels configured to detect amounts of the water vapor and air in luminous units.

Above all, the array substrate provided in the present application includes a plurality of pixel grouping units 1. Each of the pixel grouping units 1 includes at least two subpixels 2. The plurality of pixel grouping units 1 are arranged in rows and columns. Adjacent pixel grouping units 1 arranged in a row direction have opposite polarities and adjacent pixel grouping units 1 arranged in a column direction have opposite polarities. The array substrate further includes a plurality of data lines 3, each of which is located between any two adjacent columns of the pixel grouping units 1. The array substrate further includes a plurality of dual scan lines 4. Each of the plurality of dual scan lines 4 is located between any two adjacent rows of the subpixels 2. In such a way, for the pixel grouping units 1 arranged in rows and columns, two adjacent columns of pixel grouping units 1 arranged along the column direction have different polarities and two adjacent rows of pixel grouping units 1 arranged along the row direction have different polarities. Accordingly, crosstalk will not be caused by voltages between adjacent pixel grouping units 1. When human eyes view a screen image on a display screen, a phenomenon of "head shaking stripes" will not be caused as human eyes move. This improves user experiences.

Based on the structures described in above embodiments, the present embodiment will be further described in an aspect of display.

Figure 6:
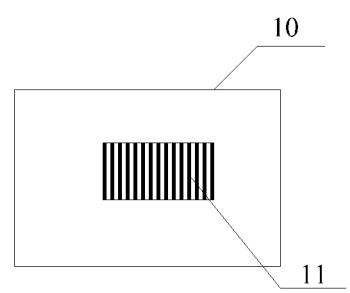
FIG. 6 is a schematic structural diagram illustrating a display screen provided in accordance with an embodiment of the present application.

FIG. 6 is a schematic structural diagram illustrating a display panel provided in accordance with an embodiment of the present application. The display panel 10 includes the array substrate 11 described in any of above embodiments. The array substrate 11 is configured to display images on the display panel 10.

The above descriptions merely illustrate preferred embodiments of the present invention but the present invention is not limited thereto. All modifications, alterations, and improvements which maintain the spirit and realm of the present invention are within the scope of the present invention.

The invention claimed is:

1. An array substrate, comprising:
a plurality of pixel grouping units, each of which comprises at least two subpixels, the plurality of pixel grouping units arranged in rows and columns, adjacent pixel grouping units arranged in a row direction having opposite polarities and adjacent pixel grouping units arranged in a column direction having opposite polarities;
a plurality of data lines, each of which is located between any two adjacent columns of the pixel grouping units;
a plurality of dual scan lines, each of the plurality of dual scan lines located between any two adjacent rows of the subpixels; and
a plurality of virtual pixels, arranged in a peripheral area of the plurality of the pixel grouping units, configured to detect amounts of water vapor and air,
wherein each of the virtual pixels and one of the at least two subpixels of the pixel grouping unit that are arranged in a same row direction and adjacent to each other have same polarity.

2. The array substrate according to claim 1, wherein each of the plurality of pixel grouping units comprises four subpixels that are arranged in two rows and two columns, two of the four subpixels arranged in the row direction have opposite polarities and two of the four subpixels arranged in the column direction have same polarity.

3. The array substrate according to claim 1, wherein the pixel grouping unit comprises six subpixels that are arranged in three rows and two columns and two adjacent subpixels of the six subpixels arranged in a same row direction have opposite polarities.

4. The array substrate according to claim 3, wherein two adjacent subpixels of the six subpixels arranged in a same column direction have opposite polarities.

5. The array substrate according to claim 3, wherein all of the six subpixels arranged in a same column direction have same polarity.

6. The array substrate according to claim 1, wherein the pixel grouping unit comprises eight subpixels that are arranged in four rows and two columns and two adjacent subpixels of the eight subpixels arranged in a same row direction have opposite polarities.

7. A display panel, comprising an array substrate which comprises:
a plurality of pixel grouping units, each of which comprises at least two subpixels, the plurality of pixel grouping units arranged in rows and columns, adjacent pixel grouping units arranged in a row direction having opposite polarities and adjacent pixel grouping units arranged in a column direction having opposite polarities;
a plurality of data lines, each of which is located between any two adjacent columns of the pixel grouping units;
a plurality of dual scan lines, each of the plurality of dual scan lines located between any two adjacent rows of the subpixels; and
a plurality of virtual pixels, arranged in a peripheral area of the plurality of the pixel grouping units, configured to detect amounts of water vapor and air,
wherein each of the virtual pixels and one of the at least two subpixels of the pixel grouping unit that are arranged in a same row direction and adjacent to each other have same polarity.

8. The array substrate according to claim 1, wherein each of the plurality of pixel grouping units comprises two subpixels that are arranged in the row direction and have opposite polarities.

* * * * *